(12) United States Patent  
Tanaka et al.

(10) Patent No.: US 7,277,303 B2  
(45) Date of Patent: *Oct. 2, 2007

(54) POWER SOURCE APPARATUS

(75) Inventors: Hironori Tanaka, Tokyo (JP); Kunihiro Matsuura, Tokyo (JP); Satoshi Kodera, Tokyo (JP)

(73) Assignee: Advantest Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/517,745

(22) Filed: Sep. 8, 2006

(65) Prior Publication Data

US 2007/0008755 A1    Jan. 11, 2007

Related U.S. Application Data

(63) Continuation of application No. 10/916,059, filed on Aug. 10, 2004, now Pat. No. 7,123,493.

(51) Int. Cl.  
*H02M 7/00* (2006.01)

(52) U.S. Cl. .............................. 363/65; 363/72; 307/52

(58) Field of Classification Search ................. 363/65, 363/67, 69, 71, 72; 307/52, 60; 324/763, 324/522, 750  
See application file for complete search history.

(56) References Cited

U.S. PATENT DOCUMENTS 5,757,634 A * 5/1998 Ferens .......................... 363/72

6,166,455 A * 12/2000 Li .................................. 307/43  
6,246,248 B1 * 6/2001 Yamagishi .................. 324/763  
6,574,124 B2 * 6/2003 Lin et al. ...................... 363/65

* cited by examiner

*Primary Examiner*—Jessica Han  
(74) *Attorney, Agent, or Firm*—Osha Liang LLP

(57) ABSTRACT

There is provided a power source apparatus that includes a master circuit and a slave circuit provided in parallel and outputs an electric current that adds an electric current output from the master circuit and an electric current output from the slave circuit as a power-supply current. The master circuit includes: a main circuit side output section operable to output an electric current depending on a given voltage; a main circuit side reference power source operable to generate a reference voltage corresponding to a power-supply voltage that the power source apparatus is to output; and a main circuit side control section operable to supply the voltage corresponding to the reference voltage to the main circuit side output section in order to control the current output from the main circuit side output section. The slave circuit includes a sub-circuit side output section operable to receive a voltage based on the electric current output from the main circuit side output section and to output an electric current depending on the voltage, the sub-circuit side output section having the same characteristic as that of the main circuit side output section.

9 Claims, 8 Drawing Sheets

POWER SOURCE APPARATUS

CROSS-REFERENCE TO RELATED APPLICATIONS

This application is a continuation of U.S. patent application Ser. No. 10/916,059 filed on Aug. 10, 2004 now U.S. Pat. No. 7,123,493.

BACKGROUND OF THE INVENTION

1. Field of the Invention

The present invention relates to a power source apparatus that generates a power-supply voltage and a power-supply current.

2. Description of Related Art

Conventionally, as a test for an electronic device such as a semiconductor circuit, there is a direct current test in which a predetermined power-supply voltage is applied to the electronic device and a power-supply current is measured at that time.

When such a test is performed, a testing device can include a master circuit and a slave circuit that are provided in parallel as a circuitry for generating a power-supply voltage and a power-supply current in some cases. The master circuit and the slave circuit have the same configuration, thereby generating a power-supply voltage, respectively. These circuits also generate an electric current respectively and output a power-supply current by adding electric currents generated by both circuits.

The master circuit and the slave circuit respectively include an output section that outputs an electric current depending on a given voltage and a control section that adjusts the voltage to be given to the output section. The control section outputs the voltage based on a given reference voltage and a voltage fed back from the voltage output from the output section, thereby adjusting outputs of the master circuit and the slave circuit to obtain a predetermined output.

In addition, the master circuit and the slave circuit output the same current as each other. In other words, when the testing device has one slave circuit, the master circuit and the slave circuit are controlled to output one-half of the power-supply current, respectively. By such a configuration, an electronic device being driven by large current is tested.

However, the master circuit and the slave circuit are controlled independently each other. Thus, when characteristics of elements composing the master circuit and the slave circuit are irregular, an output of each circuit becomes irregular. Therefore, it is not possible to adjust a power-supply voltage and a power-supply current that are supplied to an electronic device with high precision.

SUMMARY OF THE INVENTION

Therefore, it is an object of the present invention to provide a power source apparatus which can solve the foregoing problems. The above and other objects can be achieved by combinations described in the independent claims. The dependent claims define further advantageous and exemplary combinations of the present invention.

According to the first aspect of the present invention, there is provided a power source apparatus that includes a master circuit and a slave circuit provided in parallel and outputs an electric current that adds an electric current output from the master circuit and an electric current output from the slave circuit as a power-supply current. The master circuit includes: a main circuit side output section operable to output an electric current depending on a given voltage; a main circuit side reference power source operable to generate a reference voltage corresponding to a power-supply voltage that the power source apparatus is to output; and a main circuit side control section operable to supply the voltage corresponding to the reference voltage to the main circuit side output section in order to control the current output from the main circuit side output section. The slave circuit includes a sub-circuit side output section operable to receive a voltage based on the electric current output from the main circuit side output section and to output an electric current depending on the voltage, the sub-circuit side output section having the same characteristic as that of the main circuit side output section.

The master circuit may further include a feedback section operable to feed back the voltage output from the main circuit side output section to the main circuit side control section, the main circuit side control section may output the control voltage corresponding to difference between the voltage received from the feedback section and the reference voltage.

The master circuit may further include a connection section operable to detect the current output from the main circuit side output section and to supply a voltage into which the current has been converted to the sub-circuit side output section.

The slave circuit may further include: a differentiating circuit operable to differentiate the voltage output from the sub-circuit side output section; and an adding section operable to add a voltage output from the differentiating circuit and the voltage output from the connection section to supply the result to the sub-circuit side output section.

The slave circuit may further include: a differentiating circuit operable to differentiate the voltage into which the current output from the sub-circuit side output section has been converted; and an adding section operable to add a voltage output from the differentiating circuit and the voltage output from the connection section to supply the result to the sub-circuit side output section.

The slave circuit may further include a voltage follower circuit operable to receive the voltage output from the connection section and to supply a voltage corresponding to that voltage to the sub-circuit side output section.

The slave circuit may further include a sub-circuit side control section operable to generate a voltage to be supplied to the sub-circuit side output section based on difference between the electric current output from the main circuit side output section and the electric current output from the sub-circuit side output section.

The master circuit may further include a connection section operable to output a voltage corresponding to difference between the electric current output from the main circuit side output section and the electric current output from the sub-circuit side output section, the slave circuit may further include: an adding section operable to add the voltage output from the connection section and a voltage output from the sub-circuit side output section; a sub-circuit side reference power source having the substantially same characteristic as that of the main circuit side reference power source; and a sub-circuit side control section operable to generate a voltage to be supplied to the sub-circuit side output section based on difference between a voltage output from the adding section and a reference voltage output from the sub-circuit side reference power source.

According to the second aspect of the present invention, there is provided a power source apparatus that includes a master circuit and a slave circuit provided in parallel and outputs an electric current that adds an electric current output from the master circuit and an electric current output from the slave circuit as a power-supply current. The master circuit and the slave circuit respectively include an output section operable to output an electric current depending on a given voltage, the master circuit includes a control section operable to supply a control voltage that controls the current to the output sections of the master circuit and the slave circuit, the slave circuit includes a differentiating circuit operable to differentiate an output voltage or an output current of the output section of the slave circuit to detect an output change of the output section and to add a voltage corresponding to the derivative value to the control voltage to be supplied to the output section of the slave circuit.

The summary of the invention does not necessarily describe all necessary features of the present invention. The present invention may also be a sub-combination of the features described above.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
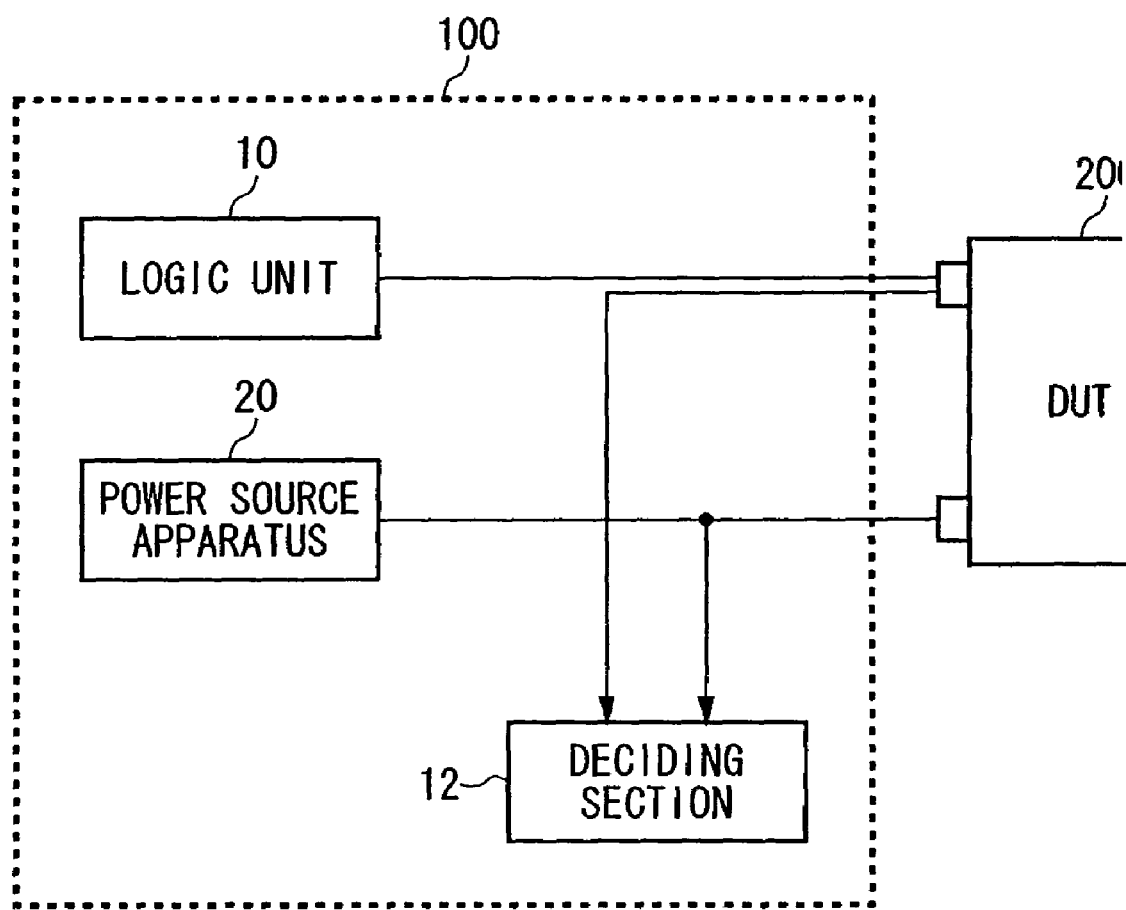
FIG. 1 is a drawing exemplary illustrating a configuration of a testing device 100 according to an embodiment of the present invention.

FIG. 1 is a drawing exemplary illustrating a configuration of a testing device 100 according to an embodiment of the present invention. The testing device 100 is a device that tests an electronic device 200 such as a semiconductor circuit, including a logic unit 10, a power source apparatus 20, and a deciding section 12.

The logic unit 10 performs a functional test or the like of the electronic device 200. For example, the logic unit 10 generates a predetermined test pattern applied to I/O pins of the electronic device 200, testing an operation of the electronic device 200.

The power source apparatus 20 is a power source that drives the electronic device 200, supplying a power-supply voltage and a power-supply current to power-source pins of the electronic device 200. In addition, the deciding section 12 determines acceptability of the device 200. For example, when testing an operation of the electronic device 200, the deciding section 12 receives an output pattern output from the electronic device 200 in response to a test pattern, checking quality by comparing the output pattern with an expected value pattern.

In addition, when performing a current-measurement test of the electronic device 200, the power source apparatus 20 applies a predetermined power-supply voltage to the electronic device 200, the deciding section 12 detecting a power-supply current being supplied to the electronic device 200 at the time to determine whether the device has abnormalities. When such a test is performed, it is preferable to utilize the power source apparatus 20 capable of outputting a power-supply voltage and a power-supply current with high precision.

Figure 2:
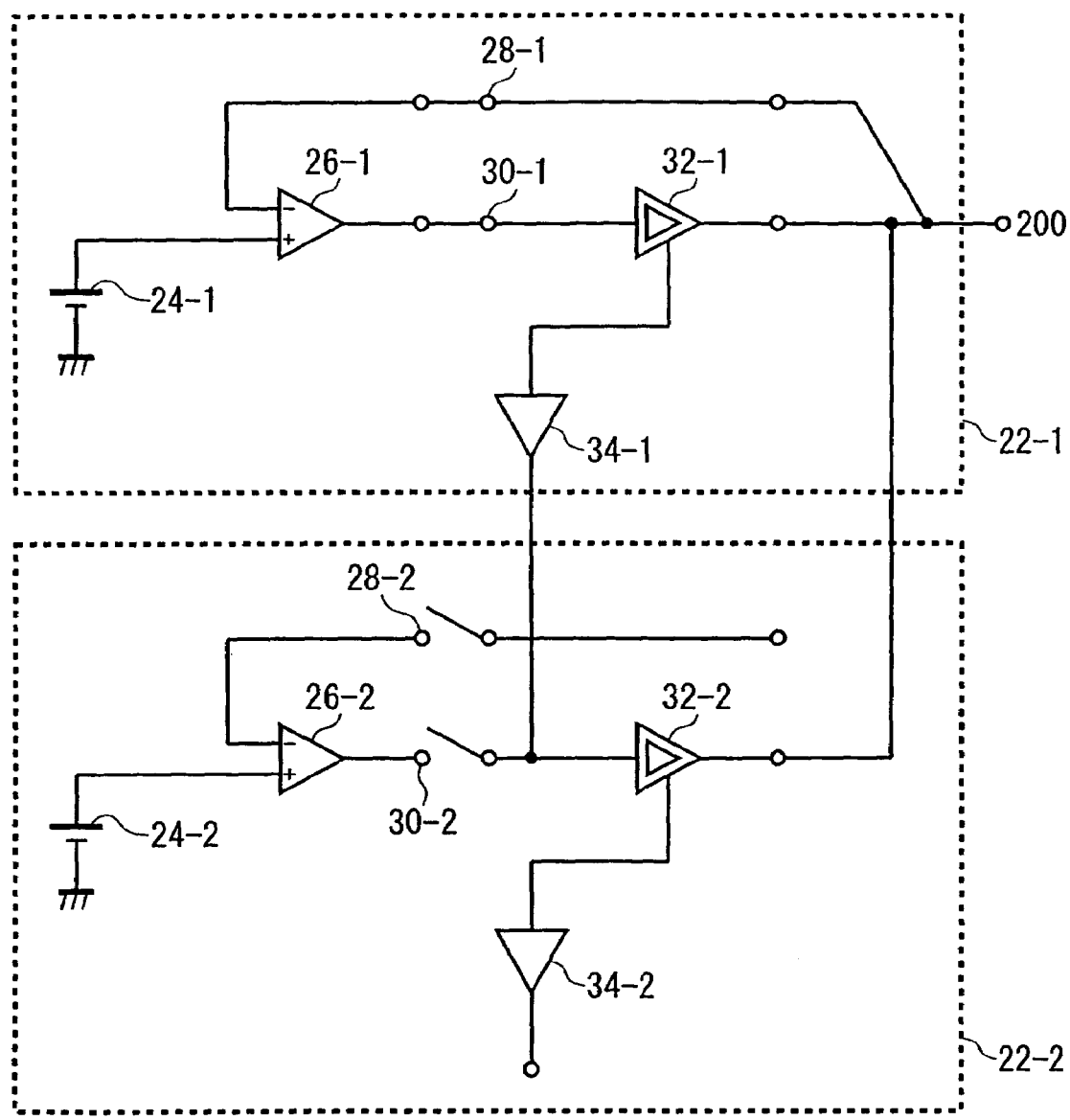
FIG. 2 is a drawing exemplary illustrating an example of a configuration of a power source apparatus 20.

FIG. 2 is a drawing exemplary illustrating a configuration of a power source apparatus 20. The power source apparatus 20 includes a master circuit 22-1 and a slave circuit 22-2 provided in parallel. The master circuit 22-1 and the slave circuit 22-2 are circuitry having the substantially same configuration. For example, the power source apparatus 20 includes a plurality of circuits that have the same configuration as the master circuit 22-1 to be described below and are provided in parallel. Any of the plurality of circuits may function as the master circuit 22-1 and the other(s) may function as the slave circuit 22-2.

The master circuit 22-1 and the slave circuit 22-2 generate the substantially same voltage and current, respectively. The power source apparatus 20 outputs an electric current, which is addition of an electric current output from the master circuit 22-1 and an electric current output, from the slave circuit 22-2 as the power-supply current. In addition, the master circuit 22-1 and the slave circuit 22-2 respectively output the substantially same voltage as the power-supply voltage that is to be supplied to the electronic device 200.

The master circuit 22-1 includes a main circuit side reference power source 24-1, a main circuit side control section 26-1, a main circuit side output section 32-1, a switch 28-1, a switch 30-1, a feedback section 29-1, and a connection section 34-1.

The main circuit side reference power source 24-1 generates a reference voltage corresponding to the power-supply voltage that the power source apparatus 20 is to output. The main circuit side output section 32-1 is a so-called transconductance amplifier, and outputs an electric current depending on a given voltage. In addition, the main circuit side control section 26-1 is a so-called regulation amplifier, and supplies a voltage corresponding to the reference voltage to the main circuit side output section 32-1 to control the current that is output from the main circuit side output section 32-1. The feedback section 29-1 feeds back the voltage output from the main circuit side output section 32-1 to the main circuit side control section 26-1. In the present embodiment, the main circuit side control section 26-1 is a differential amplifier, receiving the reference voltage to a positive input terminal and the voltage that the main circuit side output section 32-1 outputs to a negative input terminal via the feedback section 29-1. The main circuit side control section 26-1 outputs a control voltage corresponding to difference between the voltage received from the feedback section 29-1 and the reference voltage.

In addition, the switch 28-1 is a switch that selects whether it causes the feedback section 29-1 to feed back the voltage from the main circuit side output section 32-1, and the switch 30-1 is a switch that selects whether it causes the main circuit side control section 26-1 to control the main circuit side output section 32-1, the switch 28-1 and the switch 30-1 being short-circuited concurrently. By such a configuration, an output of the master circuit 22-1 is controlled in a predetermined value.

In addition, the connection section 34-1 detects the current output from the main circuit side output section 32-1, supplying the voltage into which the current has been converted to the slave circuit 22-2.

The slave circuit 22-2 includes a sub-circuit side reference power source 24-2, a sub-circuit side control section 26-2, a sub-circuit side output section 32-2, a switch 28-2, a switch 30-2, a feedback section 29-2, and a connection section 34-2. These elements have the same characteristic as the main circuit side reference power source 24-1, the main circuit side control section 26-1, the main circuit side output section 32-1, the switch 28-1, the switch 30-1, the feedback section 29-1, and the connection section 34-1 that are previously described.

The switch 28-2 separates the feedback section 29-2 from the sub-circuit side control section 26-2 to prevent an output voltage of the sub-circuit side output section 32-2 to be fed back, the switch 30-2 separates the sub-circuit side control section 26-2 from the sub-circuit side output section 32-2 to cause the sub-circuit side control section 26-2 to prohibit the control of the sub-circuit side output section 32-2. In other words, the switch 28-2 and the switch 30-2 are opened concurrently.

The sub-circuit side output section 32-2 receives a voltage that is based on the current output from the main circuit side output section 32-1, outputting an electric current depending on the voltage. In the present embodiment, the connection section 34-1 of the master circuit 22-1 supplies the voltage into which the current output from the main circuit side output section 32-1 has been converted to the sub-circuit side output section 32-2.

The connection section 34-1 is a so-called buffer, supplying the voltage to the sub-circuit side output section 32-2 to cause the sub-circuit side output section 32-2 to output the substantially same current as the current output from the main circuit side output section 32-1. In other words, the main circuit side output section 32-1 and the sub-circuit side output section 32-2 compose a current mirror circuit. Here, the power source apparatus adds the current output from the main circuit side output section 32-1 and the current output from the sub-circuit side output section 32-2 to supply the added result to power-source pins of the electronic device 200.

By such a configuration, the master circuit 22-1 and the slave circuit 22-2 reduce irregularity of the output due to irregularity of elements thereof. Thus, it is possible to control outputs of the power source apparatus 20 with high precision.

In addition, when the power source apparatus 20 includes a plurality of circuits having the same configuration as the master circuit 22-1 and the slave circuit 22-2, it is possible to cause any of these circuits to function as the master circuit 22-1 or the slave circuit 22-2 by controlling the switch 28 and the switch 30 of these circuits. In addition, since the connection section 34-2 of the circuit used as the slave circuit 22-2 does not function, the description is omitted.

Figure 3:
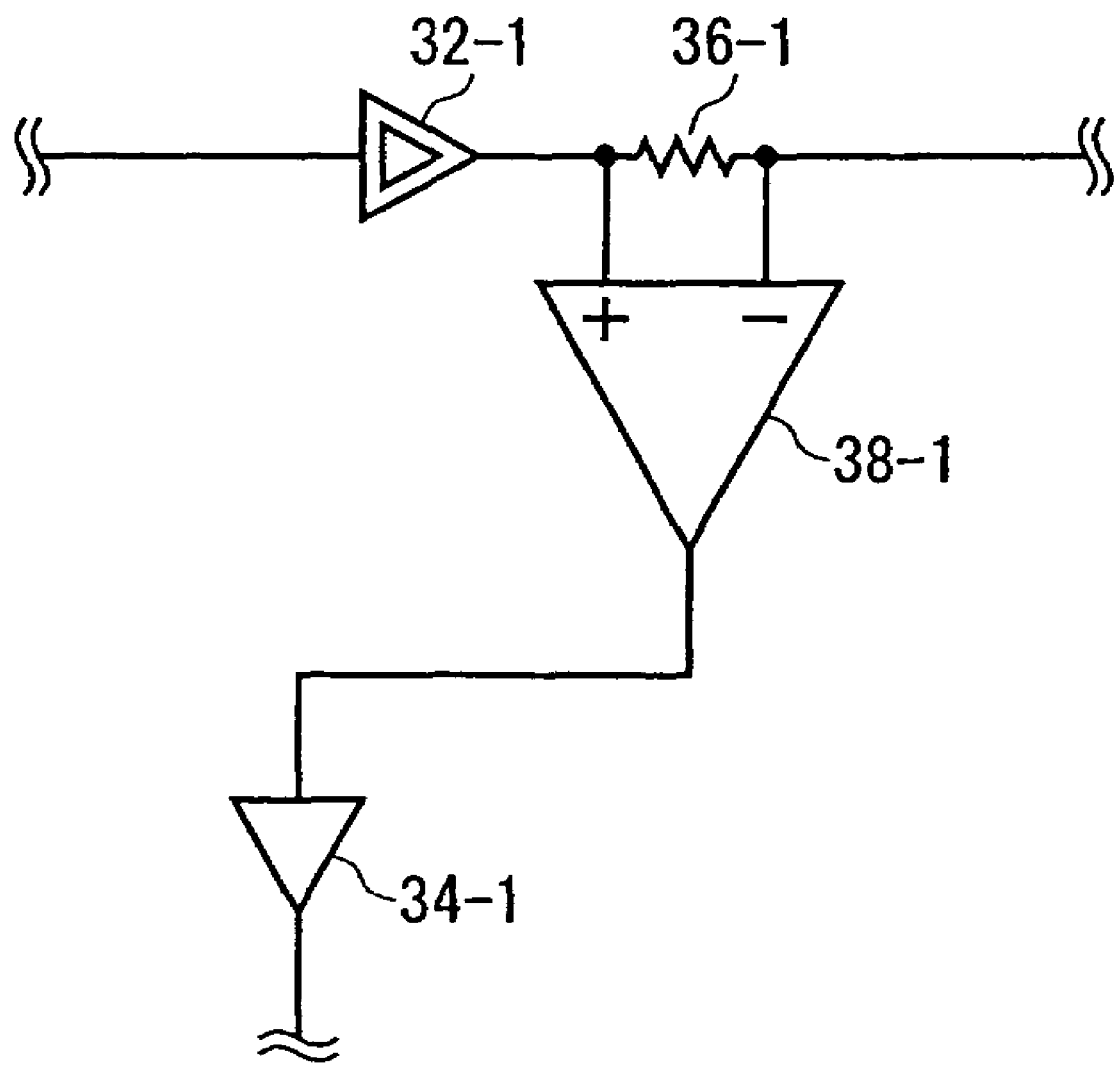
FIG. 3 is a drawing exemplary illustrating means for converting an electric current output from a main circuit side output section 32-1 to a voltage.

FIG. 3 is a drawing exemplary illustrating means for converting an electric current output from a main circuit side output section 32-1 into a voltage. The means is, for example, a differential amplifier 38-1, outputting the voltage corresponding to potential difference between both ends of an output resistance 36-1 of the main circuit side output section 32-1 to the connection section 34-1.

Figure 4:
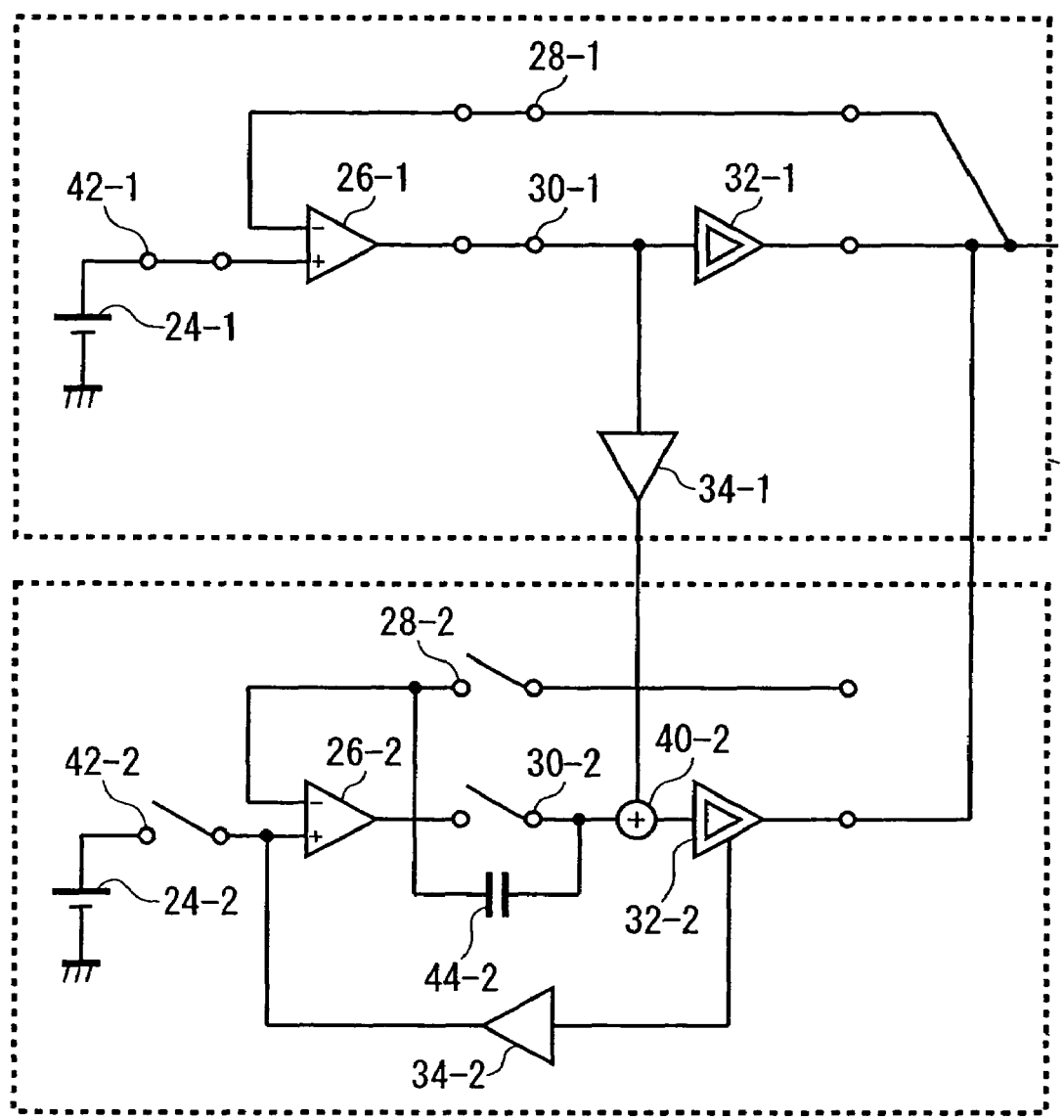
FIG. 4 is a drawing illustrating another example of a configuration of the power source apparatus 20.

FIG. 4 is a drawing illustrating another example of a configuration of the power source apparatus 20. In the present embodiment, the connection section 34-1 of the master circuit 22-1 supplies the control voltage output from the main circuit side control section 26-1 to the sub-circuit side output section 32-2. In addition, the master circuit 22-1 in this embodiment further includes a switch 42-1 that selects whether the main circuit side reference power source 24-1 is connected to the main circuit side control section 26-1 in addition to a configuration of the master circuit 22-1 explained in FIG. 2. The switch 42-1 of the master circuit 22-1 is short-circuited to connect the main circuit side reference power source 24-1 to the main circuit side control section 26-1. Since the other elements of the master circuit 22-1 have the same functions as those of the elements explained in FIG. 2, the description is omitted.

In addition, the slave circuit 22-2 in this embodiment further includes a switch 42-2, a differentiating circuit 44-2, and adding section 40-2 in addition to a configuration of the slave circuit 22-2 explained in FIG. 2. The switch 42-2 of the slave circuit 22-2 is opened to separate the sub-circuit side reference voltage from the sub-circuit side control section 26-2. In addition, the sub-circuit side control section 26-2 is a differential amplifier, functioning as a voltage follower circuit of which output is fed back to a negative input terminal thereof. The voltage, into which the current output from the sub-circuit side output section 32-2 has been converted, is supplied to a positive input terminal of the sub-circuit side control section 26-2.

The differentiating circuit 44-2 is provided on an output terminal of the sub-circuit side control section 26-2, differentiating the voltage output from the sub-circuit side output section 32-2. The differentiating circuit 44-2 may be a capacitor that is serially provided on the output terminal of the sub-circuit side control section 26-2.

The adding section 40-2 adds a voltage output from the differentiating circuit 44-2 and the voltage output from the connection section 34-1 to supply the result to the sub-circuit side output section 32-2. In other words, when the output of the sub-circuit side output section 32-2 is changed depending on the output of the main circuit side output section 32-1, the slave circuit 22-2 in this embodiment improves followability of the output of the sub-circuit side output section 32-2. The follow ability of the output of the sub-circuit side output section 32-2 is improved by adding the derivative value of the output of the sub-circuit side output section 32-2 to the voltage being given the sub-circuit side output section 32-2.

Figure 5:
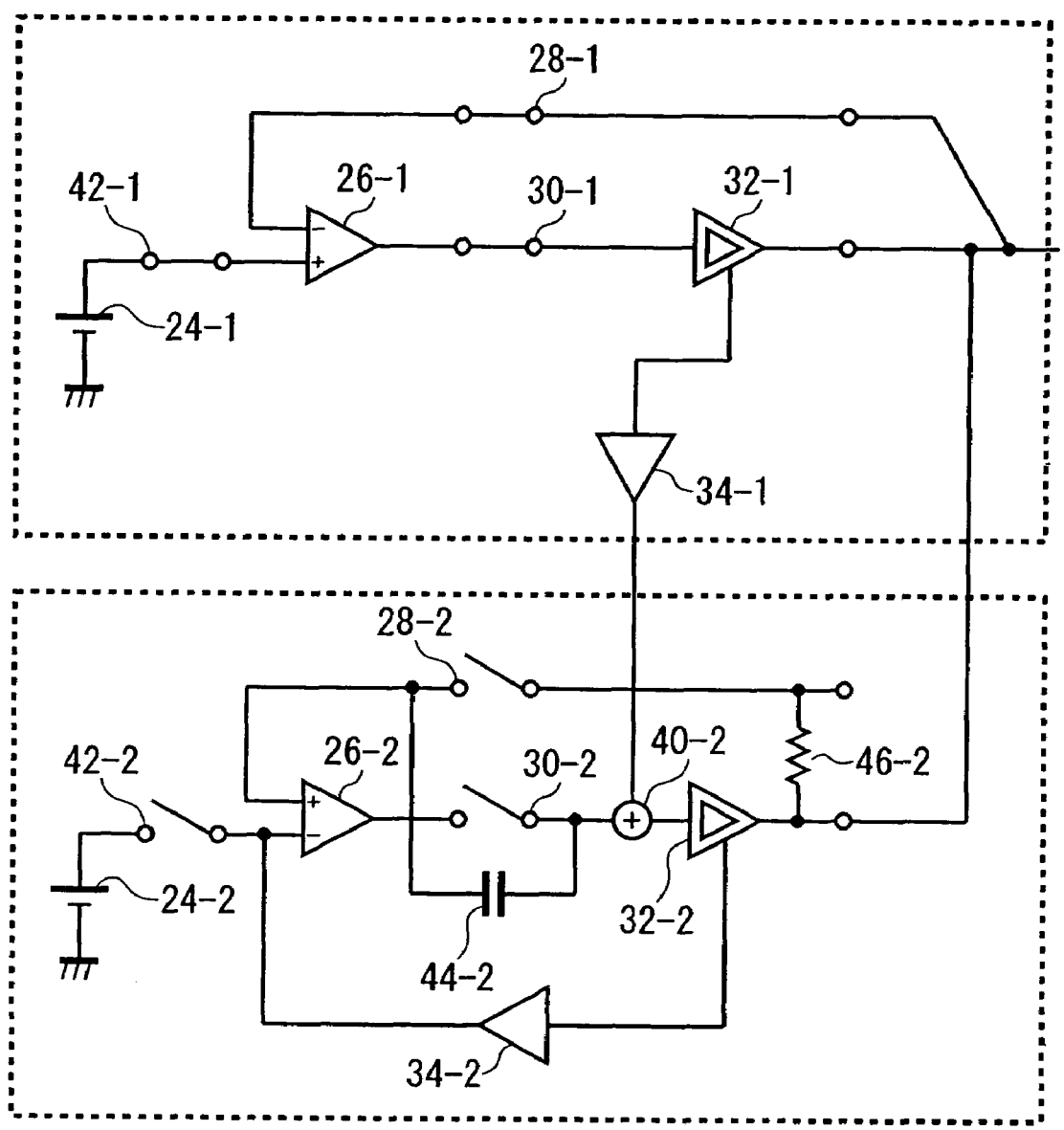
FIG. 5 is a drawing illustrating yet another example of a configuration of the power source apparatus 20.

FIG. 5 is a drawing illustrating yet another example of a configuration of the power source apparatus 20. In the present embodiment, the master circuit 22-1 has the same elements as those of FIG. 2 except that the master circuit 22-1 includes a switch 42-1. In addition, the switch 42-1 is the same switch as the switch 42-1 explained in FIG. 4.

In the present embodiment, the slave circuit 22-2 further includes a resistor 46-2 in addition to a configuration of the slave circuit 22-2 explained in FIG. 4. In addition, a differentiating circuit 44-2 in this embodiment differentiates a voltage into which the current output from the sub-circuit side output section 32-2 has been converted. The other elements of the slave circuit 22-2 are the same as those of the slave circuit 22-2 explained in FIG. 4.

The resistor 46-2 connects an output terminal of the sub-circuit side output section 32-2 to the feedback section 29-2. In addition, the switch 28-2 of the slave circuit 22-2 is short-circuited, feeding back the voltage output from the sub-circuit side output section 32-2 to a positive input terminal of the sub-circuit side control section 26-2.

The differentiating circuit 44-2 differentiates the voltage into which the current output from the sub-circuit side output section 32-2 has been converted, the adding section 40-2 adding the voltage output from the differentiating circuit 44-2 and the voltage output from the connection section 34-1 to supply the result to the sub-circuit side output section 32-2.

The slave circuit 22-2 according to the embodiments of FIGS. 4 and 5 differentiates the output voltage or the output current of the sub-circuit side output section 32-2 to detect the output change of that output section, adding the voltage corresponding to that derivative value to the control voltage to be supplied to the sub-circuit side output section 32-2. Therefore, it is possible to improve followability of the output of the sub-circuit side output section 32-2.

Figure 6:
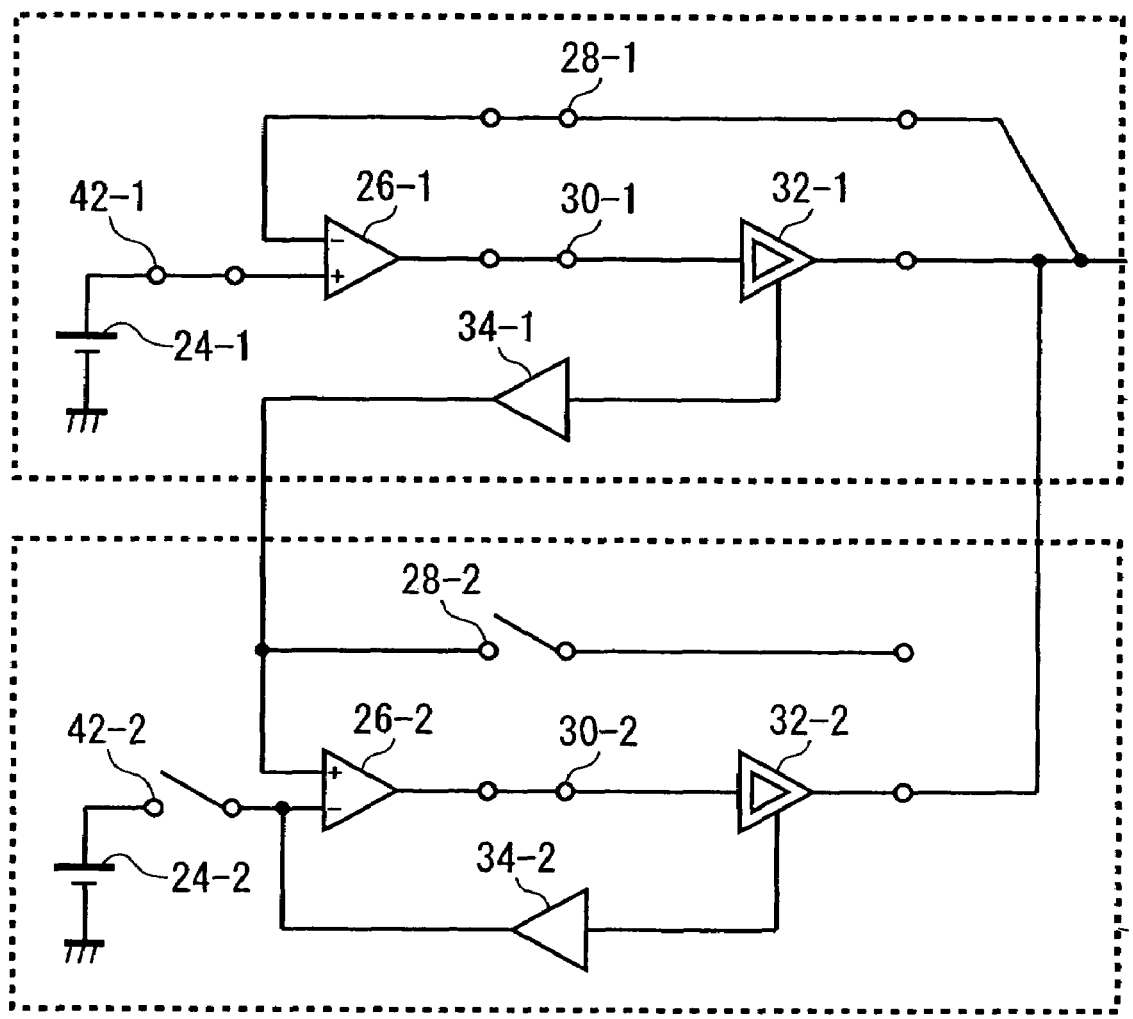
FIG. 6 is a drawing illustrating yet another example of a configuration of the power source apparatus 20.

FIG. 6 is a drawing illustrating yet another example of a configuration of the power source apparatus 20. In the present embodiment, since the master circuit 22-1 is identical with the master circuit 22-1 explained in FIG. 5, the description will be omitted. In addition, the slave circuit 22-2 further includes a switch 42-2 in addition to the configuration of the slave circuit 22-2 explained in FIG. 2. The switch 42-2 is identical with the switch 42-2 explained in FIG. 5.

In the present embodiment, the sub-circuit side control section 26-2 and the sub-circuit side output section 32-2 are short-circuited, and thus the sub-circuit side control section 26-2 controls the sub-circuit side output section 32-2. The sub-circuit side control section 26-2 generates a voltage to be supplied to the sub-circuit side output section 32-2 based on difference between the current output from the main circuit side output section 32-1 and the current output from the sub-circuit side output section 32-2. For example, the sub-circuit side control section 26-2 is a differential amplifier, receiving the voltage, into which the current output from the main circuit side output section 32-1 has been converted, to a positive input terminal and the voltage, into which the current output from the sub-circuit side output section 32-2 has been converted, to a negative input terminal.

By such a configuration, the master circuit 22-1 and the slave circuit 22-2 reduce irregularity of output due to irregularity of elements thereof. Thus, it is possible to control outputs of the power source apparatus 20 with high precision.

Figure 7:
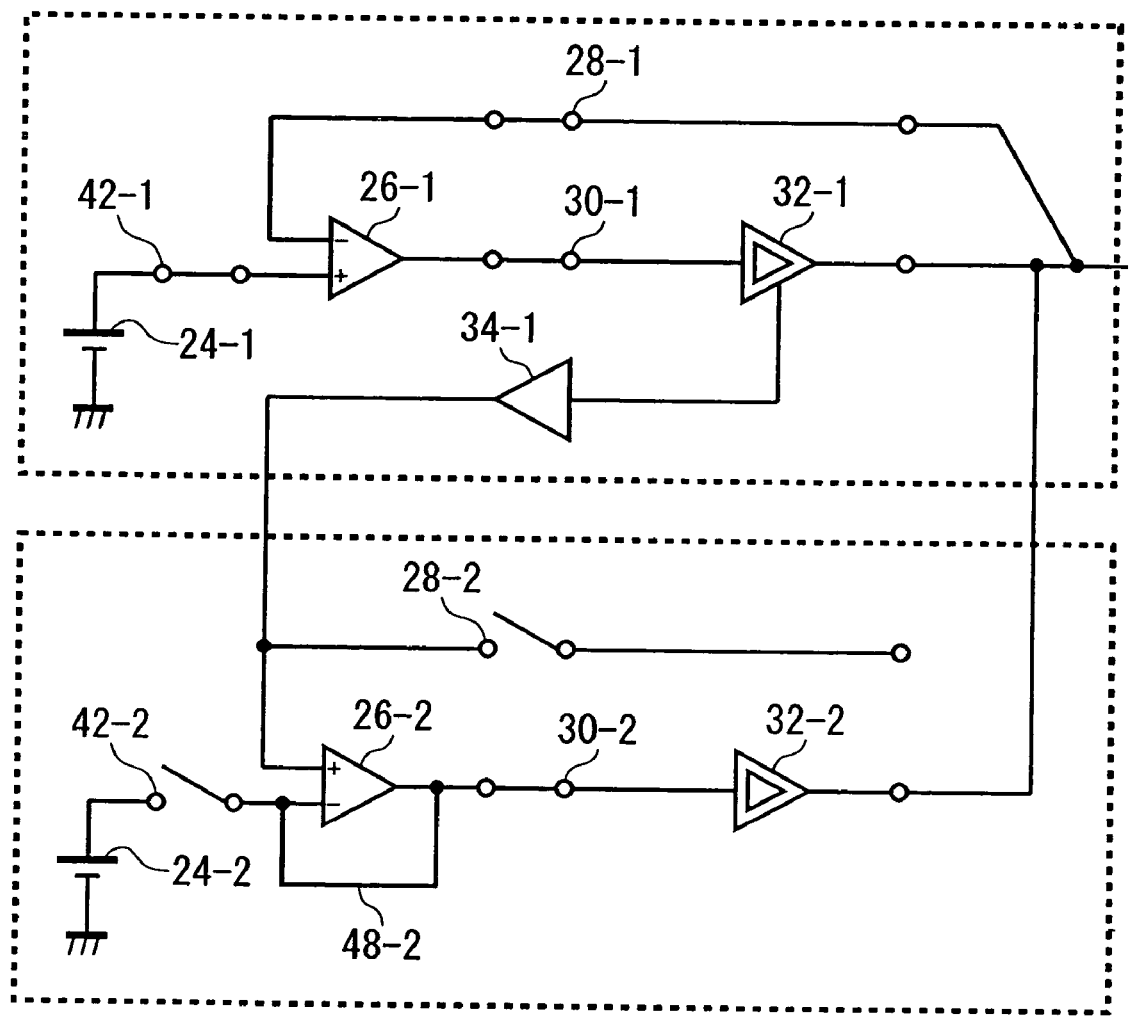
FIG. 7 is a drawing illustrating yet another example of a configuration of the power source apparatus 20.

FIG. 7 is a drawing illustrating yet another example of a configuration of the power source apparatus 20. Since the master circuit 22-1 in this embodiment is identical with the master circuit 22-1 explained in FIG. 6, the description will be omitted.

In addition, the sub-circuit side control section 26-2 in this embodiment is a differential amplifier, receiving a voltage output from the connection section 34-1 and functioning as a voltage follower circuit that supplies a voltage corresponding to that voltage to the sub-circuit side output section 32-2.

By such a configuration, the master circuit 22-1 and the slave circuit 22-2 reduce irregularity of output according to irregularity of elements thereof. Thus, it is possible to control outputs of the power source apparatus 20 with high precision.

Figure 8:
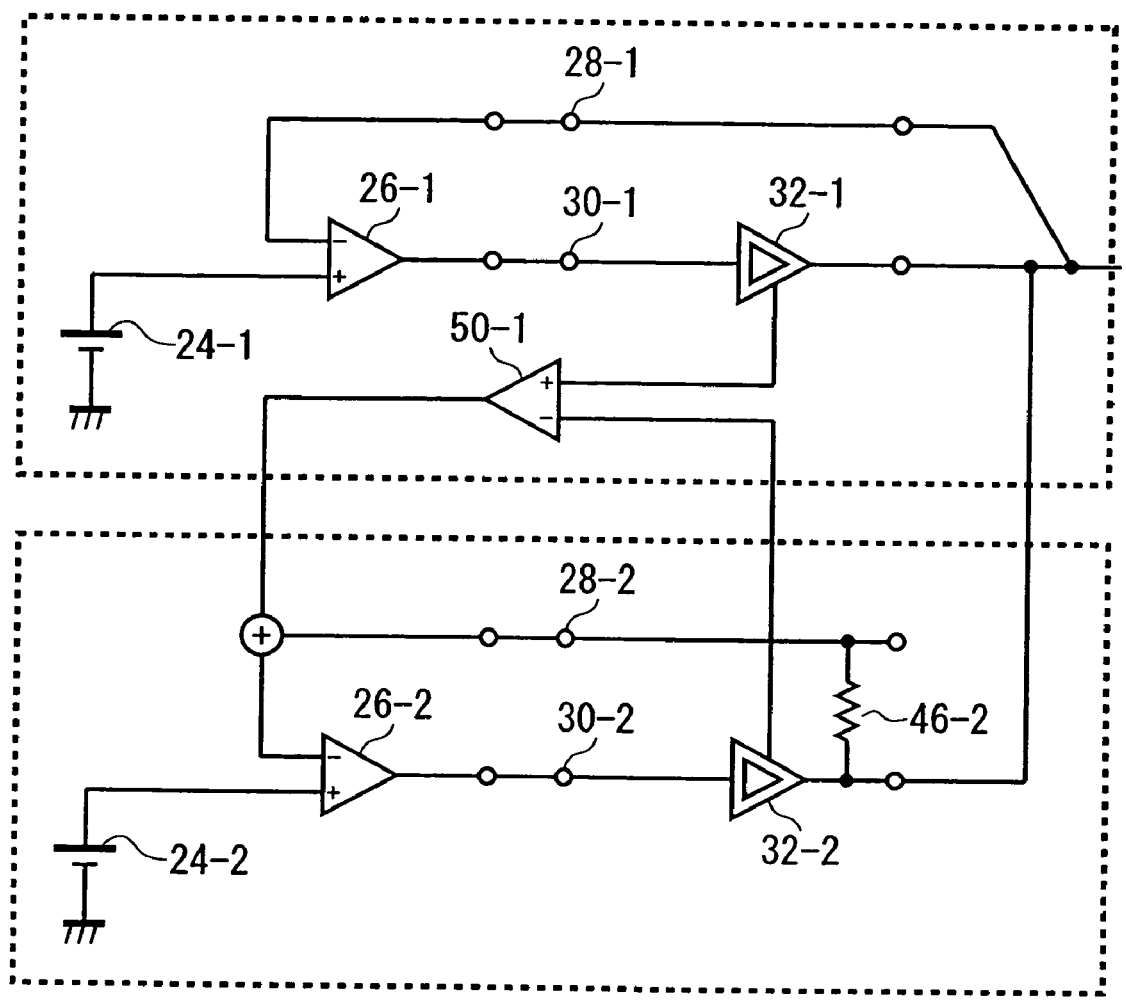
FIG. 8 is a drawing illustrating yet another example of a configuration of the power source apparatus 20.

FIG. 8 is a drawing illustrating yet another example of a configuration of the power source apparatus 20. In the present embodiment, the master circuit 22-1 includes a connection section 50-1 in place of the connection section 34-1 compared with the configuration of the master circuit 22-1 explained in FIG. 2. The connection section 50-1 outputs a voltage corresponding to difference between the current output from the main circuit side output section 32-1 and the current output from the sub-circuit side output section 32-2. For example, the connection section 50-1 is a differential amplifier, receiving the voltage into which the current output from the main circuit side output section 32-1 has been converted to a positive input terminal and the voltage into which the current output from the sub-circuit side output section 32-2 has been converted to a negative input terminal.

In addition, the slave circuit 22-2 in this embodiment further includes an adding section 31-2 and a resistor 46-2 in addition to the configuration of the slave circuit 22-2 explained in FIG. 2. The resistor 46-2 connects an output terminal of the sub-circuit side output section 32-2 to the feedback section 29-2. In addition, the voltage output from the sub-circuit side output section 32-2 of the slave circuit 22-2 is fed back to the adding section 31-2 connected to a negative input terminal of the sub-circuit side control section 26-2.

The adding section 31-2 adds the voltage output from the connection section 50-1 and the voltage output from the sub-circuit side output section 32-2 to input the result to the negative input terminal of the sub-circuit side control section 26-2.

The sub-circuit side control section 26-2 generates a voltage to be supplied to the sub-circuit side output section 32-2 depending on difference between the voltage output from the adding section 31-2 and the reference voltage output from the sub-circuit side reference power source 24-2. In the present embodiment, the sub-circuit side control section 26-2 supplies the generated control voltage to the sub-circuit side output section 32-2.

By such a configuration, the master circuit 22-1 and the slave circuit 22-2 reduce irregularity of output due to irregularity of elements thereof. Thus, it is possible to control outputs of the power source apparatus 20 with high precision.

As is apparent from the above description, according to a power source apparatus according to the present invention, a master circuit and a slave circuit may reduce irregularity of output due to irregularity of elements thereof. Thus, it is possible to control outputs of a power source apparatus with high precision.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. A test apparatus for testing an electronic device, comprising:
    a deciding section coupled to the electronic device, said deciding section determining whether the device has abnormalities; and
    a power source apparatus coupled to the electronic device, said power source apparatus including a master circuit and at least one slave circuit provided in parallel with said master circuit and outputting an electric current composed by adding an electric current output from said master circuit to an electric current output from said slave circuit as a power-supply current,
    said master circuit comprising:
    a main circuit side output section operable to output an electric current depending on a given voltage;

a main circuit side reference power source operable to generate a reference voltage corresponding to a power-supply voltage that the power source apparatus is to output;

a main circuit side control section operable to supply the voltage corresponding to the reference voltage to said main circuit side output section in order to control the current output from said main circuit side output section; and a connection section operable to detect the current output from said main circuit side output section and to supply a voltage into which the current has been converted to said slave circuit, and said slave circuit comprising:

a sub-circuit side output section operable to receive a voltage based on the electric current output from said main circuit side output section and to output an electric current depending on the voltage, said sub-circuit side output section having the same characteristic as that of said main circuit side output section.

2. The test apparatus of claim 1, wherein said power source apparatus is coupled to a power-source pin of the electronic device and supplies a predetermined power-supply voltage with the power-source pin, and said deciding section determines whether the device has abnormalities based on the power-supply current supplied with the power-source pin at the state that said power source apparatus supplies the predetermined power-supply voltage.

3. The test apparatus of claim 1, further comprising a logic unit coupled to the electronic device, said logic unit supplying a predetermined test pattern with the electronic device, Wherein said deciding section receives an output pattern output from the electronic device in response to the test pattern and determines whether the device has abnormalities based on a comparison of the output pattern with an expected value pattern.

4. The test apparatus of claim 1, wherein said master circuit further comprises a feedback section operable to feed back the voltage output from said main circuit side output section to said main circuit side control section, and said main circuit side control section outputs the control voltage corresponding to difference between the voltage received from said feedback section and the reference voltage.

5. The test apparatus of claim 1, wherein said slave circuit further comprises:

a differentiating circuit operable to differentiate the voltage output from said sub-circuit side output section; and an adding section operable to add a voltage output from said differentiating circuit and the voltage output from said connection section to supply the result to said sub-circuit side output section.

6. The test apparatus of claim 1, wherein said slave circuit further comprises:

a differentiating circuit operable to differentiate the voltage into which the current output from said sub-circuit side output section has been converted; and an adding section operable to add a voltage output from said differentiating circuit and the voltage output from said connection section to supply the result to said sub-circuit side output section.

7. The test apparatus of claim 1, wherein said slave circuit further comprises a voltage follower circuit operable to receive the voltage output from said connection section and to supply a voltage corresponding to that voltage to said sub-circuit side output section.

8. The test apparatus of claim 1, wherein said slave circuit further comprises a sub-circuit side control section operable to generate a voltage to be supplied to said sub-circuit side output section based on difference between the electric current output from said main circuit side output section and the electric current output from said sub-circuit side output section.

9. The test apparatus of claim 1, further comprising a connection section operable to output a voltage corresponding to difference between the electric current output from said main circuit side output section and the electric current output from said sub-circuit side output section, wherein said slave circuit further comprises:

an adding section operable to add the voltage output from said connection section and a voltage output from said sub-circuit side output section;

a sub-circuit side reference power source having the substantially same characteristic as that of said main circuit side reference power source; and a sub-circuit side control section operable to generate a voltage to be supplied to said sub-circuit side output section based on difference between a voltage output from said adding section and a reference voltage output from said sub-circuit side reference power source.

* * * * *